(12) United States Patent
Harris et al.

(10) Patent No.: US 12,717,872 B2
(45) Date of Patent: Aug. 25, 2026

(54) SWITCHED SPATIAL TENSOR DATA MANIPULATION WITH PHOTONICS

(71) Applicant: Lightmatter, Inc., Boston, MA (US)

(72) Inventors: Nicholas C. Harris, Boston, MA (US); Carl Ramey, Westborough, MA (US); Darius Bunandar, Boston, MA (US); Ayon Basumallik, Framingham, MA (US)

(73) Assignee: Lightmatter, Inc., Mountain View, CA (US)

(*) Notice: Subject to any disclaimer, the term of this patent is extended or adjusted under 35 U.S.C. 154(b) by 1024 days.

(21) Appl. No.: 17/903,201

(22) Filed: Sep. 6, 2022

(65) Prior Publication Data

US 2023/0071600 A1 Mar. 9, 2023

Related U.S. Application Data

(60) Provisional application No. 63/241,455, filed on Sep. 7, 2021.

(51) Int. Cl.
*G06F 17/16* (2006.01)
*G06E 1/04* (2006.01)

(52) U.S. Cl.
CPC ............. *G06F 17/16* (2013.01); *G06E 1/045* (2013.01)

(58) Field of Classification Search
CPC .. G06E 1/00; G06E 1/02; G06E 1/045; G06E 3/001; G06E 3/003; G06E 3/005; G06E 3/006; G06E 3/008; G06F 17/16; G06F 7/76; G06F 7/78–785
See application file for complete search history.

(56) References Cited

U.S. PATENT DOCUMENTS

| | | | | |
|---|---|---|---|---|
| 6,898,013 | B2 * | 5/2005 | Hall ..................... | H04B 10/801 359/618 |
| 10,803,259 | B2 | 10/2020 | Kenney et al. | |
| 11,093,215 | B2 | 8/2021 | Harris et al. | |
| 11,218,227 | B2 | 1/2022 | Bunandar et al. | |

(Continued)

OTHER PUBLICATIONS

Qiao, Chunming, and Rami G. Melhem. “Time-division optical communications in multiprocessor arrays.” Proceedings of the 1991 ACM/IEEE conference on Supercomputing. 1991. (Year: 1991).*

(Continued)

*Primary Examiner* — Matthew D Sandifer
(74) *Attorney, Agent, or Firm* — Wolf, Greenfield & Sacks, P.C.

(57) ABSTRACT

A method for manipulating an input vector is described. The method involves controlling a plurality of optical switches to obtain a nominal orientation vector or a transpose orientation vector based on a plurality of input optical signals encoding the input vector and received at the plurality of optical switches. The nominal orientation vector and the transpose orientation vector represent transposed versions of one another. A memory system comprising a first section configured to store vectors in accordance with a nominal orientation and a second section configured to store vectors in accordance with a transpose orientation. A controller stores the nominal orientation vector in the first section of the memory system or stores the transpose orientation vector in the second section of the memory system.

20 Claims, 9 Drawing Sheets

(56) References Cited

U.S. PATENT DOCUMENTS

| | | | | |
|---|---|---|---|---|
| 2004/0264847 | A1 * | 12/2004 | Koh .................... | G02B 6/3502<br>385/16 |
| 2021/0405682 | A1 | 12/2021 | Gould et al. | |

OTHER PUBLICATIONS

Qiao, Chunming. "Efficient matrix operations in a reconfigurable array with spanning optical buses." Proceedings Frontiers' 95. The Fifth Symposium on the Frontiers of Massively Parallel Computation. IEEE, 1995. (Year: 1995).*

Yang, Lin, et al. "On-chip CMOS-compatible optical signal processor." Optics express 20.12 (2012): 13560-13565. (Year: 2012).*

Peserico, Nicola, Bhavin J. Shastri, and Volker J. Sorger. "Integrated photonic tensor processing unit for a matrix multiply: a review." Journal of Lightwave Technology 41.12 (2023): 3704-3716. (Year: 2023).*

Feldmann, Johannes, et al. "Parallel convolutional processing using an integrated photonic tensor core." Nature 589.7840 (2021): 52-58. (Year: 2021).*

* cited by examiner

SWITCHED SPATIAL TENSOR DATA MANIPULATION WITH PHOTONICS

CROSS-REFERENCE TO RELATED APPLICATION

This application claims the benefit under 35 U.S.C. § 119(e) of U.S. Provisional Patent Application Ser. No. 63/241,455, entitled "SWITCHED SPATIAL TENSOR DATA MANIPULATION WITH PHOTONICS," filed on Sep. 7, 2021, which is hereby incorporated herein by reference in its entirety.

BACKGROUND

Deep learning, machine learning, latent-variable models, neural networks and other matrix-based differentiable programs are used to solve a variety of problems, including natural language processing and object recognition in images. Solving these problems with deep neural networks typically requires long processing times to perform the required computation. The conventional approach to speed up deep learning algorithms has been to develop specialized hardware architectures. This is because conventional computer processors, e.g., central processing units (CPUs), which are composed of circuits including hundreds of millions of transistors to implement logical gates on bits of information represented by electronic signals, are designed for general purpose computing and are therefore not optimized for the particular patterns of data movement and computation required by the algorithms that are used in deep learning and other matrix-based differentiable programs.

SUMMARY OF THE DISCLOSURE

Some embodiments relate to a system for manipulating an input vector. The system comprises a plurality of optical switches configured to receive the input vector; and a controller configured to obtain a nominal orientation vector or a transpose orientation vector based on the input vector by controlling the plurality of optical switches, wherein the nominal orientation vector and the transpose orientation vector represent transposed versions of one another.

In some embodiments, the nominal orientation vector has a same orientation as the input vector, and the transpose orientation vector has an opposite orientation with respect to the input vector.

In some embodiments, the controller is further configured to store the nominal orientation vector in a first section of a memory system, or store the transpose orientation vector in a second section of the memory system.

In some embodiments, the optical switches comprise at least one of a Mach-Zehnder interferometer, a microring resonator, a photonic crystal cavity, and a movable optical element.

In some embodiments, the optical receiver comprises a photodetector, an amplifier, and an analog-to-digital converter.

In some embodiments, the controller is configured to obtain the nominal orientation vector by generating a first plurality of electronic signals, wherein generating the first plurality of electronic signals comprises controlling the plurality of optical switches to route the input vector to a first plurality of optical receivers.

In some embodiments, the controller is configured to obtain the transpose orientation vector by generating a second plurality of electronic signals, wherein generating the second plurality of electronic signals comprises controlling the plurality of optical switches to route the input vector to a second plurality of optical receivers.

Some embodiments relate to a method for manipulating an input vector. The method comprises controlling a plurality of optical switches to obtain a nominal orientation vector or a transpose orientation vector based on a plurality of input optical signals encoding the input vector and received at the plurality of optical switches, wherein the nominal orientation vector and the transpose orientation vector represent transposed versions of one another.

In some embodiments, obtaining the nominal orientation vector comprises generating a first plurality of electronic signals by controlling the plurality of optical switches to route the plurality of input optical signals to a first plurality of optical receivers, and storing the first plurality of electronic signals in a first section of a memory system configured to store vectors in accordance with a nominal orientation.

In some embodiments, obtaining the transpose orientation vector comprises generating a second plurality of electronic signals by controlling the plurality of optical switches to route the plurality of input optical signals to a second plurality of optical receivers, and storing the second plurality of electronic signals in a second section of the memory system configured to store vectors in accordance with a transpose orientation.

In some embodiments, the transpose orientation vector is a transposed version of the input vector.

In some embodiments, the method further comprises generating the plurality of input optical signals using optical matrix multiplication.

Some embodiments relate to a system for manipulating an input vector. The system comprises a plurality of optical switches comprising a first optical output and a second optical output, the plurality of optical switches being configured to receive a plurality of input optical signals encoding the input vector; a first plurality of optical receivers coupled to the respective first optical outputs of the plurality of optical switches, and a second plurality of optical receivers coupled to the respective second optical outputs of the plurality of optical switches; a memory system comprising a first section configured to store vectors in accordance with a nominal orientation and a second section configured to store vectors in accordance with a transpose orientation, wherein the nominal orientation and the transpose orientation represent transposed versions of one another; and a controller configured to obtain a nominal orientation vector or a transpose orientation vector. Obtaining the nominal orientation vector comprises generating a first plurality of electronic signals by controlling the plurality of optical switches to route the plurality of input optical signals to the first plurality of optical receivers, and storing the first plurality of electronic signals in the first section of the memory system. Obtaining the transpose orientation vector comprises generating a second plurality of electronic signals by controlling the plurality of optical switches to route the plurality of input optical signals to the second plurality of optical receivers, and storing the second plurality of electronic signals in the second section of the memory system.

In some embodiments, the transpose orientation vector is a transposed version of the input vector.

In some embodiments, the optical switches comprise at least one of a Mach-Zehnder interferometer, a microring resonator, a photonic crystal cavity, and a movable optical element.

In some embodiments, the optical receivers comprise optical detectors and analog-to-digital converters (ADC).

In some embodiments, the first and second sections of the memory system are part of a common memory chip.

In some embodiments, the first section of the memory system is part of a first memory chip, and the second section of the memory system is part of a second memory chip.

In some embodiments, the memory system comprises a static random access memory (SRAM).

In some embodiments, the system further comprises a photonic accelerator configured to generate the plurality of input optical signals using optical matrix multiplication.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in the figures in which they appear.

DETAILED DESCRIPTION

I. Overview

Figure 1:
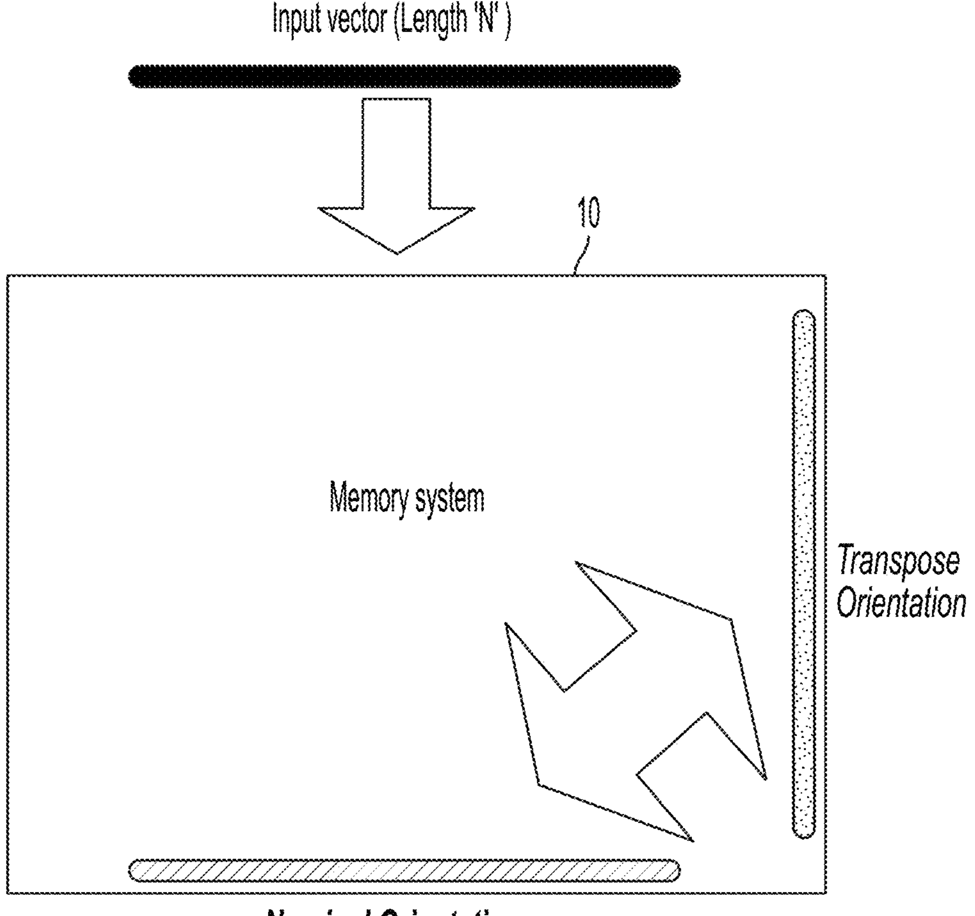
FIG. 1 is a schematic diagram of a memory system comprising a first section configured to store vectors in accordance with a nominal orientation and a second section configured to store vectors in accordance with a transpose orientation, the nominal orientation and the transpose orientation representing transpose versions of one another, in accordance with some embodiments.

The inventors have developed techniques for manipulating tensor data (including matrix data and vector data) using photonics. Currently, machine learning algorithms are dominated by processing of tensors, which can be viewed as objects with multiple dimensions (or indices). Oftentimes, in machine learning, elements of a tensor are manipulated—e.g., copied or moved—before the tensor can be used in a calculation. One typical operation of such tensor manipulation is the transpose operation. For a matrix (2D tensor), a transpose operation flips the elements of the matrix with respect to the diagonal. For a vector (1D tensor), a transpose operation transforms a column vector into a row vector, and a row vector into a column vector. In general, a transpose operation swaps two dimensions/indices of a tensor.

In artificial intelligence computing, the transpose operation is commonly performed before or after a computation. The inventors have recognized and appreciated that, in integrated electronic chips, a transpose operation can be energetically expensive, since the physical routing (e.g., wires, traces, etc.) may span centimeters, leading to substantial parasitic effects (e.g., capacitive, resistive, and inductive effects). The inventors have conceived and introduce herein new methods for realizing spatial tensor transpose operations that leverage the high-speed, low energy transport nature of photonics. The new methods described herein involve obtaining a nominal orientation vector or a transpose orientation vector from an input vector. The nominal orientation vector may have the same orientation as the input vector. For example, the nominal orientation vector may be a column vector where the input vector is a column vector, and may be a row vector where the input vector is a row vector. By contrast, the transpose orientation vector may have the opposite orientation with respect to the input vector. For example, the transpose orientation vector may be a row vector where the input vector is a column vector, and may be a column vector where the input vector is a row vector. It should be noted that the methods described herein are not limited to use with one dimensional tensors, and can be applied to tensors of any dimensions.

Some embodiments involve memory systems having at least a portion organized in accordance with a nominal orientation and a transpose orientation, where the nominal orientation and the transpose orientation represent transposed versions of one another. For example, a memory system may have a first section configured to store vectors in accordance with a nominal orientation and a second section configured to store vectors in accordance with a transpose orientation. Input vectors which the user intends to utilize in accordance with the nominal orientation are stored in the first section of the memory system. Input vectors which the user intends to utilize in accordance with the transpose orientation are stored in the second section of the memory system. In some embodiments, this selection may be performed in the photonic domain, using optical switches. An optical switch may have an input, a first output and a second output, among other possible terminals. The input receives an input optical signal representing an element of an input vector. An optical switch optically routes the input optical signal either to the first output or to the second output. In some embodiments, the first output corresponds to the section of the memory system associated with the nominal orientation and the second output corresponds to the section of the memory system associated with the transpose orientation. Accordingly, controlling the optical switches to route the input optical signals to the first outputs results in a through operation—the input vector is stored in the memory system without undergoing a transpose operations. By contrast, controlling the optical switches to route the input optical signals to the second outputs results in a transpose operation—a transposed version of the input vector is stored in the memory system. The input vector may be subsequently retrieved from the memory system in its original orientation or its transposed orientation, for further processing, depending on the needs of the application. The low parasitic nature associated with the act of switching signals in the photonic domain allows execution of these operations with minimal latency and minimal energy consumption. As a result, the methods described herein can be scaled to systems designed to handle vast amounts of data.

Accordingly, some embodiments relate to a method for manipulating an input vector. The method comprises controlling a plurality of optical switches to obtain a nominal orientation vector or a transpose orientation vector based on a plurality of input optical signals encoding the input vector and received at the plurality of optical switches. The nominal orientation vector and the transpose orientation vector represent transposed versions of one another. The nominal orientation vector may have the same orientation as the input vector, and the transpose orientation vector may have the opposite orientation with respect to the input vector. In some embodiments, obtaining the nominal orientation vector involves generating a first plurality of electronic signals by controlling the plurality of optical switches to route the plurality of input optical signals to a first plurality of optical receivers, and storing the first plurality of electronic signals in a first section of a memory system configured to store vectors in accordance with a nominal orientation. In some embodiments, obtaining the transpose orientation vector involves generating a second plurality of electronic signals by controlling the plurality of optical switches to route the plurality of input optical signals to a second plurality of optical receivers, and storing the second plurality of electronic signals in the second section of the memory system configured to store vectors in accordance with a transpose orientation.

It should also be noted that, in some embodiments, the optical switches may be controlled to route an optical signal both to the first output and to the second output, thereby operating as a splitter. These embodiments allow storage of both versions of an input vector, one in accordance with the nominal orientation and one in accordance with the transpose orientation. Thus, in these embodiments, controlling a plurality of optical switches to obtain a nominal orientation vector or a transpose orientation vector may involve controlling the plurality of optical switches to obtain both a nominal orientation vector and a transpose orientation vector.

II. Tensor Data Manipulation Using Photonics

FIG. 1 is a schematic diagram of a memory system comprising a first section configured to store vectors in accordance with a nominal orientation and a second section configured to store vectors in accordance with a transpose orientation, the nominal orientation and the transpose orientation representing transpose versions of one another. The first and second sections may represent physically distinct locations of the memory system, or virtual segments of the memory system. Memory system 10 may be implemented as a single memory chip or a multiple memory chip. Accordingly, the first section and the second section may be on a common chip or on separate chips. Memory system 10 may be a static random access memory (SRAM) in some embodiments, although other types of memories are also possible.

In some embodiments, vectors stored in accordance with the nominal orientation represent row vectors and vectors stored in accordance with the transpose orientation represent column vectors, as shown in the example of FIG. 1. Thus, an operation involving use of a row vector may retrieve the desired vector from the section of the memory system configured in accordance with the nominal orientation. By contrast, an operation involving use of a column vector may retrieve the desired vector from the section of the memory system configured in accordance with the transpose orientation. It should be noted that the opposite logic is also possible, whereby vectors stored in accordance with the nominal orientation represent column vectors and vectors stored in accordance with the transpose orientation represent row vectors.

It should also be noted that the techniques described herein can be extended to tensors having dimensions greater than one. For example, a matrix may be stored in its original orientation in the first section of the memory system or may be stored in the transposed orientation in the second section of the memory system.

Figure 2A:
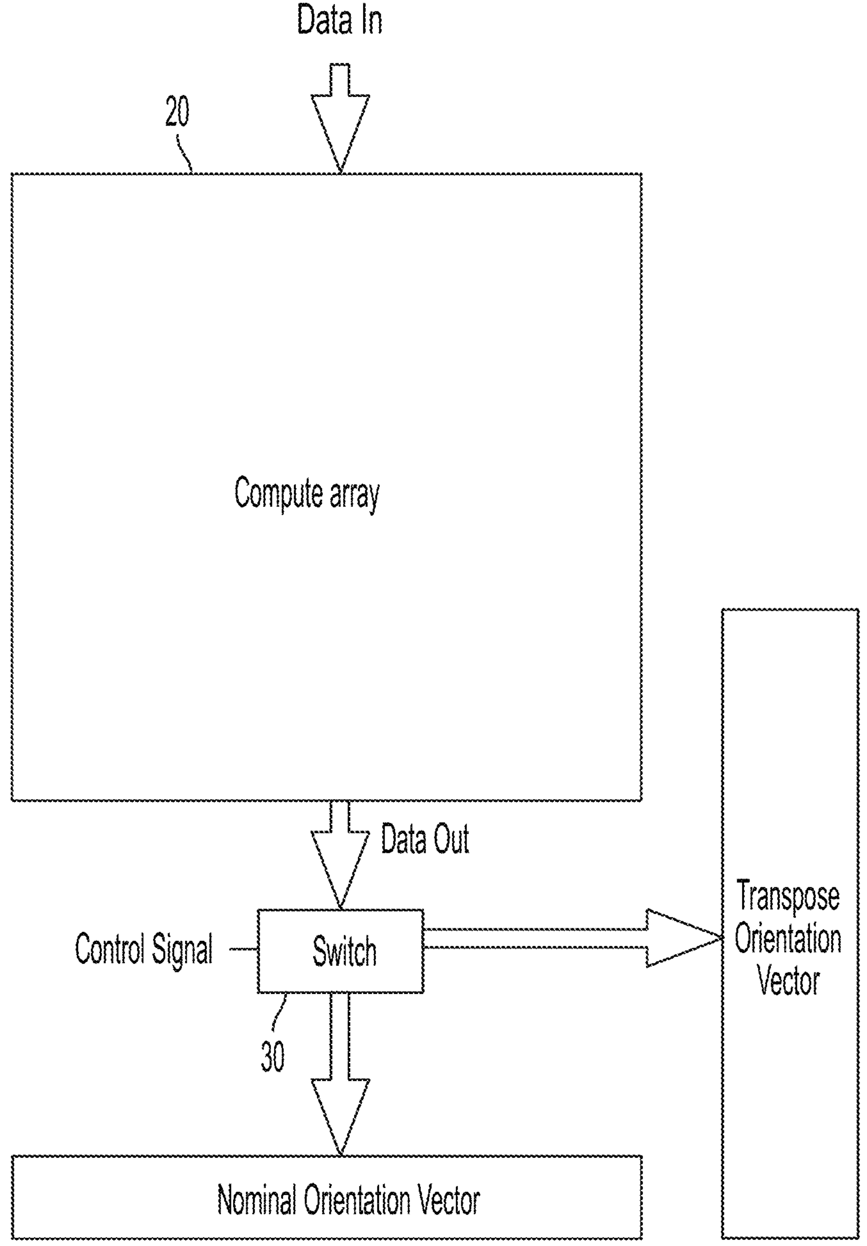
FIG. 2A is a block diagram of a compute array configured to write data into the memory system of FIG. 1 based on the nominal orientation or based on the transpose orientation using a switch, in accordance with some embodiments.
Figure 2B:
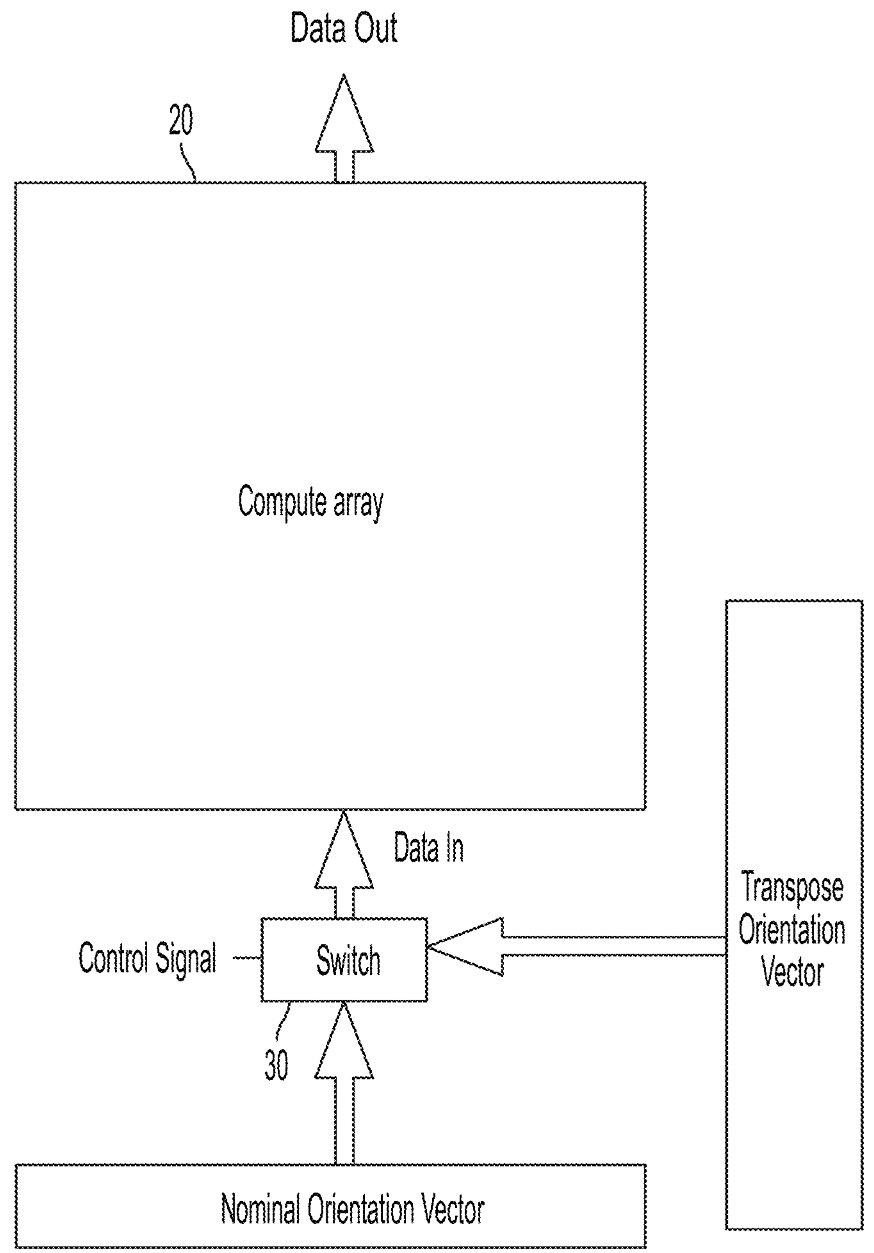
FIG. 2B is a block diagram of a compute array configured to read data from the memory system of FIG. 1 based on the nominal orientation or based on the transpose orientation using a switch, in accordance with some embodiments.

FIG. 2A is a block diagram of a compute array configured to write data into the memory system of FIG. 1, and FIG. 2B is a block diagram of a compute array configured to read data from the memory system of FIG. 1, in accordance with some embodiments. The system of FIGS. 2A-2B include a compute array 20, a switch 30 and a memory system 10 arranged to store nominal orientation vectors and transpose orientation vectors as described in connection with FIG. 1.

A memory write operation, as shown in FIG. 2A, involves generating "data out" using compute array 20 based on "data in." The compute array may process the data in in any suitable way to generate the data out. In some embodiments, the compute array may include a photonic accelerator configured to perform matrix multiplication, an example of which is described in detail further below. However, the techniques described herein are not limited to any particular type of compute array. Switch 30 is controlled to route the data output from the compute array to the section of the memory system representing the nominal orientation or to the section of the memory system representing the transpose orientation, depending on whether the user wishes to retain the data in the original orientation or the transpose orientation.

A memory read operation, as shown in FIG. 2B, involves providing as input to the compute array data in the nominal orientation or in the transpose orientation. Where the application calls for input data to be arranged in the nominal orientation, the data is retrieved from the section of the memory system representing the nominal orientation. Where the application calls for input data to be arranged in the transpose orientation, the data is retrieved from the section of the memory system representing the transpose orientation. This operation is performed using switch 30.

Figure 3A:
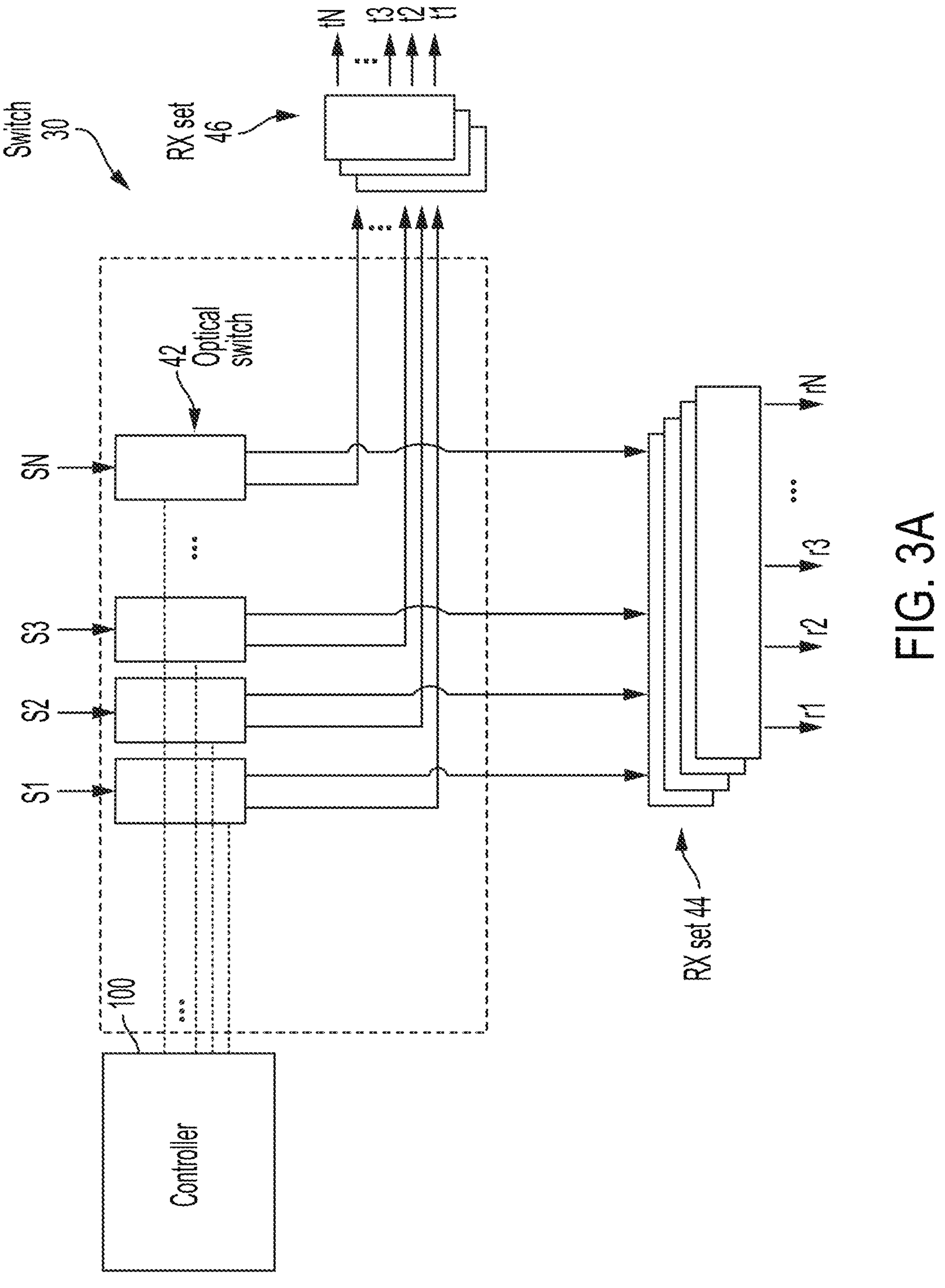
FIGS. 3A-3B are block diagrams illustrating an example implementation of the system of FIG. 2A, in accordance with some embodiments.

FIGS. 3A-3A are block diagrams illustrating an example implementation of the system of FIG. 2A, in accordance with some embodiments. In this example, switch 30 is implemented using a plurality of optical switches 42. Each optical switch 42 has an optical input, a first optical output and a second optical output, among other possible terminals. Additionally, each optical switch includes an electronic terminal coupled to controller 100. Controller 100 controls each optical switch to select the output to which to route the input optical signal. Optical switches 42 may be implemented using any suitable optical device that can be controlled to select one or more of multiple outputs. Examples of these devices include Mach-Zehnder interferometers, microring resonators, photonic crystal cavities, and movable optical elements, among other possible examples. Some such devices may be designed to select more than one output. For example, a Mach Zehnder interferometer may be configured to route part of the incoming optical power to the first output and to route part of the incoming optical power to the second output.

With further reference to FIG. 3A, the inputs of optical switches 42 receive input optical signals ($S_1$, $S_2$, $S_3$ . . . $S_N$) each representing an element of an input vector. Thus, collectively, the input optical signals received by the optical switches 42 represent an input vector. The input vector may be obtained using compute array 20 (see "data out" of FIG. 2A), or may be the result of other operations. Controller 100 controls each optical switch to optically route the input optical signal ($S_1$, $S_2$, $S_3$ . . . $S_N$) either to the first output or to the second output (including, in some embodiments, to both). The first outputs of the optical switches 42 are coupled to respective optical receivers of receiver (RX) set 44. The second outputs of the optical switches 42 are coupled to respective optical receivers of receiver (RX) set 46.

Figure 4:
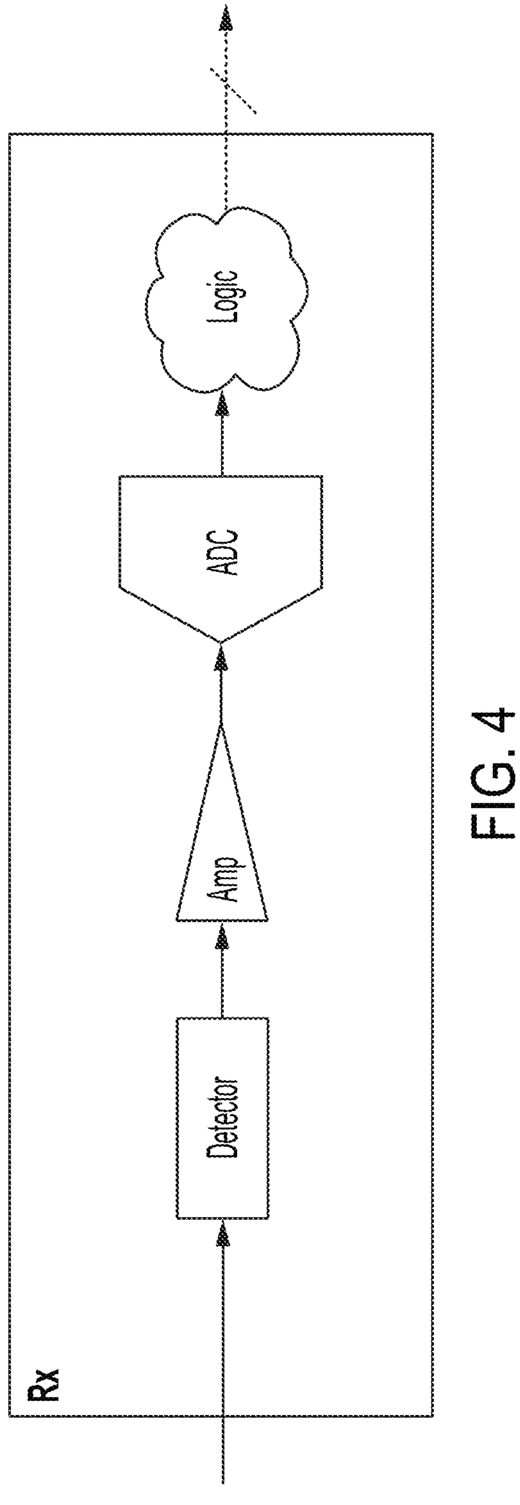
FIG. 4 is a block diagram illustrating an example of an optical receiver, in accordance with some embodiments.

An example implementation of an optical receiver that may be part of RX set 44 or RX set 46 is shown in FIG. 4, in accordance with some embodiments. The input of an optical receiver is a signal that is defined in the photonic domain and the output of the optical receiver is a signal that is defined in the electronic digital domain. The receiver of FIG. 4 includes an optical detector, an amplifier (e.g., a trans-impedance amplifier), an analog-to-digital converter (ADC), and logic circuitry for processing the output of the ADC as needed. Referring back to FIG. 3A, when controller 100 routes optical signals $S_1$, $S_2$, $S_3$ . . . $S_N$ to RX set 44, the optical receivers of this set produce electronic digital signals $r_1$, $r_2$, $r_3$ . . . $r_N$. Similarly, when controller 100 routes optical signals $S_1$, $S_2$, $S_3$ . . . $S_N$ to RX set 46, the optical receivers of this set produce electronic digital signals $t_1$, $t_2$, $t_3$ . . . $t_N$.

Figure 3B:
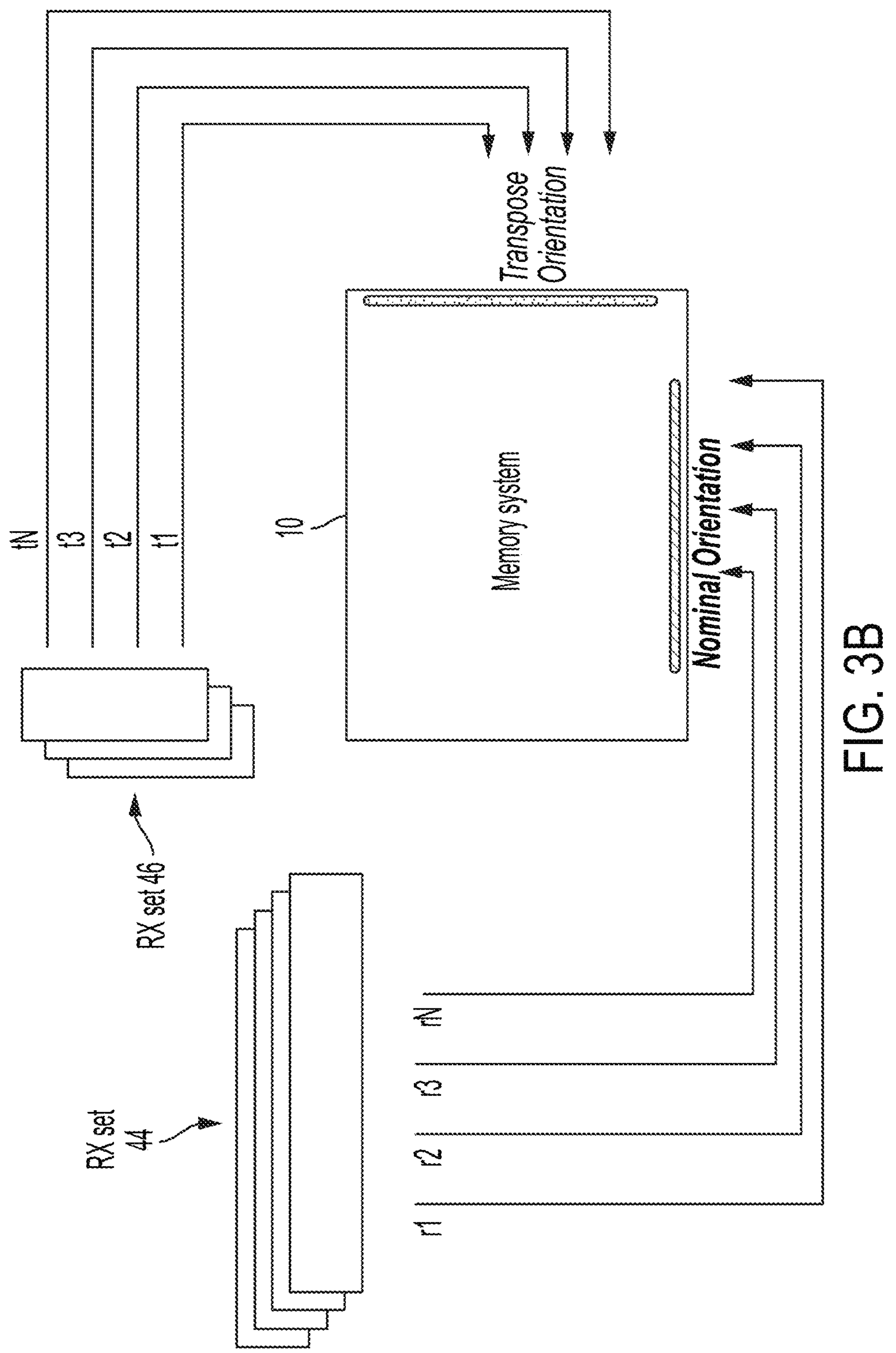

Referring now to FIG. 3B, electronic digital signals $r_1$, $r_2$, $r_3$ . . . $r_N$ represent the input vector in the nominal orientation and electronic digital signals $t_1$, $t_2$, $t_3$ . . . $t_N$ represent the input vector in the transpose orientation. Accordingly, controller 100 stores electronic digital signals $r_1$, $r_2$, $r_3$ . . . $r_N$ in the section of memory system 10 configured in accordance with the nominal orientation and stores electronic digital signals $t_1$, $t_2$, $t_3$ . . . $t_N$ in the section of memory system 10 configured in accordance with the transpose orientation.

Accordingly, some embodiments provide a method for manipulating an input vector. The input vector may be a 1D tensor, or may represent a portion of a multi-dimensional tensor, such as a column or a row of a matrix. The method involves controlling a plurality of optical switches (e.g., optical switches 42) to obtain a nominal orientation vector or a transpose orientation vector (or both) based on a plurality of input optical signals (e.g., $S_1$, $S_2$, $S_3$ . . . $S_N$) encoding the input vector and received at the plurality of optical switches. The nominal orientation vector and the transpose orientation vector represent transposed versions of one another. The transpose orientation vector may be a transposed version of the input vector. In some embodiments, obtaining the nominal orientation vector involves generating a first plurality of electronic signals (e.g., $r_1$, $r_2$, $r_3$ . . . $r_N$) by controlling the plurality of optical switches to route the plurality of input optical signals to a first plurality of optical receivers (e.g., RX set 44), and storing the first plurality of electronic signals in a first section of a memory system configured to store vectors in accordance with a nominal orientation. In some embodiments, obtaining the transpose orientation vector involves generating a second plurality of electronic signals (e.g., $t_1$, $t_2$, $t_3$ . . . $t_N$) by controlling the plurality of optical switches to route the plurality of input optical signals to a second plurality of optical receivers (e.g., RX set 46), and storing the second plurality of electronic signals in the second section of the memory system configured to store vectors in accordance with a transpose orientation.

It should be noted that more generally, the optical switches can be configured from the original indices of the original electronic signals (e.g., $r_1$, $r_2$, $r_3$ . . . $r_N$) and the indices of the target electronic signals (e.g., $t_1$, $t_2$, $t_3$ . . . $t_N$) to perform an arbitrary permute operation. Transpose is one particular instance of the permute operation.

For 1D tensors, the method may result in the input vector being stored in the memory system without first being transposed, or in the input vector being stored in the memory system upon first being transposed (or both). For 2D tensors, the method may result in a row of an input matrix being stored in the memory system as a row, or in the row of the input matrix being stored in the memory system as a column (or both). Thus, the method may be used to store in a memory system a matrix or a transposed version of the matrix. Similarly, the method may be used to store in a memory system a tensor (with dimension greater than two) or a version of the tensor where two indices are swapped.

III. Example of a Compute Array

In some embodiments, a compute array 20 may include an accelerator configured to execute neural networks or other machine learning and deep learning algorithms. Accelerators are microprocessors that are capable of accelerating certain types of workloads. Typically, workloads that can be accelerated are offloaded to high-performance accelerators, which are much more efficient at performing workloads such as artificial intelligence, machine vision, and deep learning. Accelerators are specific purpose processors and are often programmed to work in conjunction with general purpose processors to perform a task. Analog accelerators are accelerators that perform computations in the analog domain. As such, analog accelerators typically involve digital-to-analog conversion and analog-to-digital conversion, which allow an analog accelerator to communicate with digital hardware.

Photonic accelerators are a particular class of analog accelerators in which computations are performed in the photonic domain (using light). The inventors have recognized and appreciated that using optical signals (instead of, or in combination with, electronic signals) overcomes some of the problems with electronic computing. Optical signals travel at the speed of light. Thus, the latency of optical signals is far less of a limitation than electrical propagation delay. Additionally, virtually no power is dissipated by increasing the distance traveled by the light signals, opening up new topologies and processor layouts that would not be feasible using electronic signals. Thus, photonic processors offer far better speed and efficiency performance than conventional electronic processors.

Some embodiments relate to photonic accelerators designed to run machine learning algorithms or other types of data-intensive computations. Certain machine learning algorithms (e.g., support vector machines, artificial neural networks and probabilistic graphical model learning) rely heavily on linear transformations on multi-dimensional arrays/tensors. The simplest linear transformation is a matrix-vector multiplication, which using conventional algorithms has a complexity on the order of $O(N^2)$, where N is the dimensionality of a square matrix being multiplied by a vector of the same dimension. General matrix-matrix (GEMM) operations are ubiquitous in software algorithms, including those for graphics processing, artificial intelligence, neural networks and deep learning.

Figure 5A:
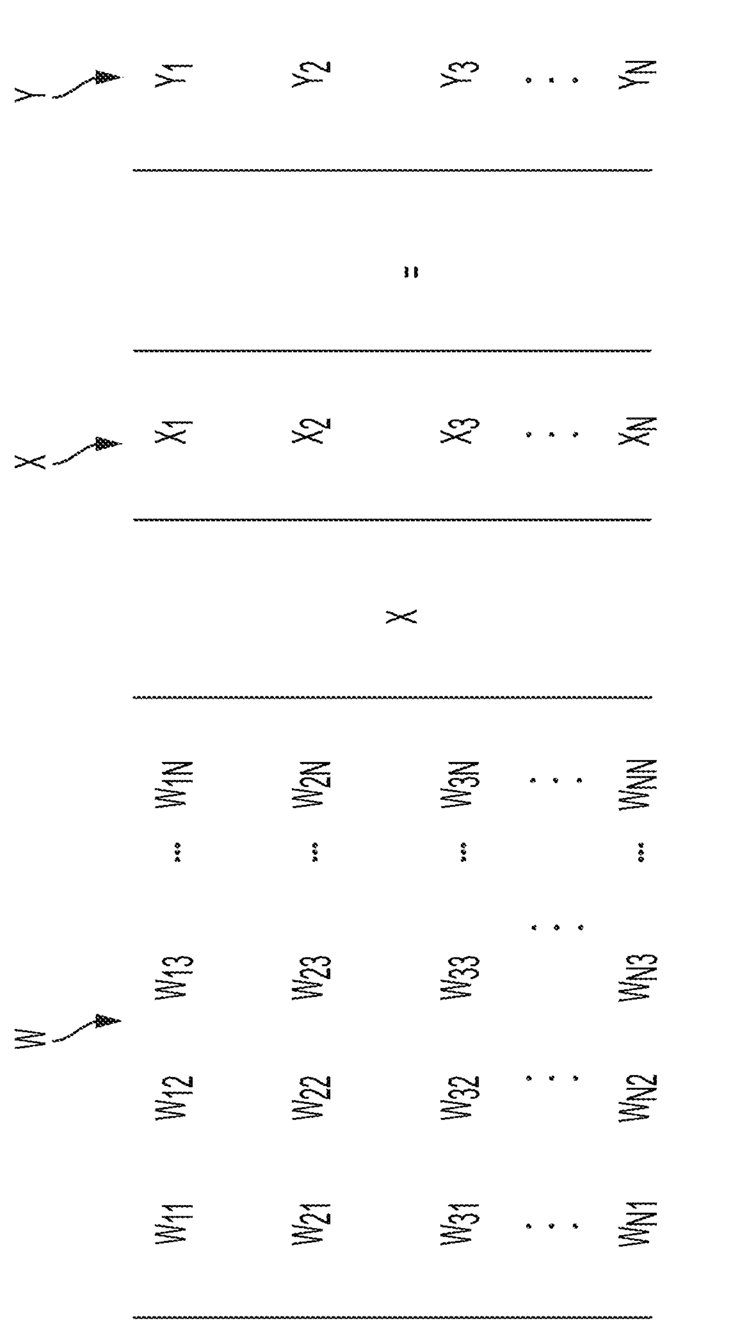
FIG. 5A illustrates a representative matrix-vector multiplication, in accordance with some embodiments.

FIG. 5A is a representation of a matrix-vector multiplication, in accordance with some embodiments. Matrix-vector multiplication is an example of GEMM. Matrix W is referred to herein as "weight matrix," "input matrix" or simply "matrix," and the individual elements of matrix W are referred to herein as "weights," "matrix values" or "matrix parameters." Vector X is referred to herein as "input vector," and the individual elements of vector X are referred to as "input values," or simply "inputs." Vector Y is referred to herein as "output vector," and the individual elements of vector Y are referred to as "output values," or simply "outputs." In this example, W is an N×N matrix, though embodiments of the present application are not limited to square matrices or to any specific dimension. In the context of artificial neural networks, matrix W can be a weight matrix, or a block of submatrix of the weight tensor, or an activation (batched) matrix, or a block of submatrix of the (batched) activation tensor, among several possible examples. Similarly, the input vector X can be a vector of the weight tensor or a vector of the activation tensor, for example.

The matrix-vector multiplication of FIG. 5A can be decomposed in terms of scalar multiplications and scalar additions. For example, an output value $y_i$ (where i=1, 2 . . . N) can be computed as a linear combination of the input values $x_1, x_2 \ldots x_N$. Obtaining $y_1$ involves performing scalar multiplications (e.g., $W_{i1}$ times $x_1$, and $W_{i2}$ times $x_2$) and scalar additions (e.g., $W_{i1}x_1$ plus $W_{i2}x_2$). In some embodiments, scalar multiplications, scalar additions, or both, may be performed in the photonic domain, as discussed in detail further below.

Figure 5B:
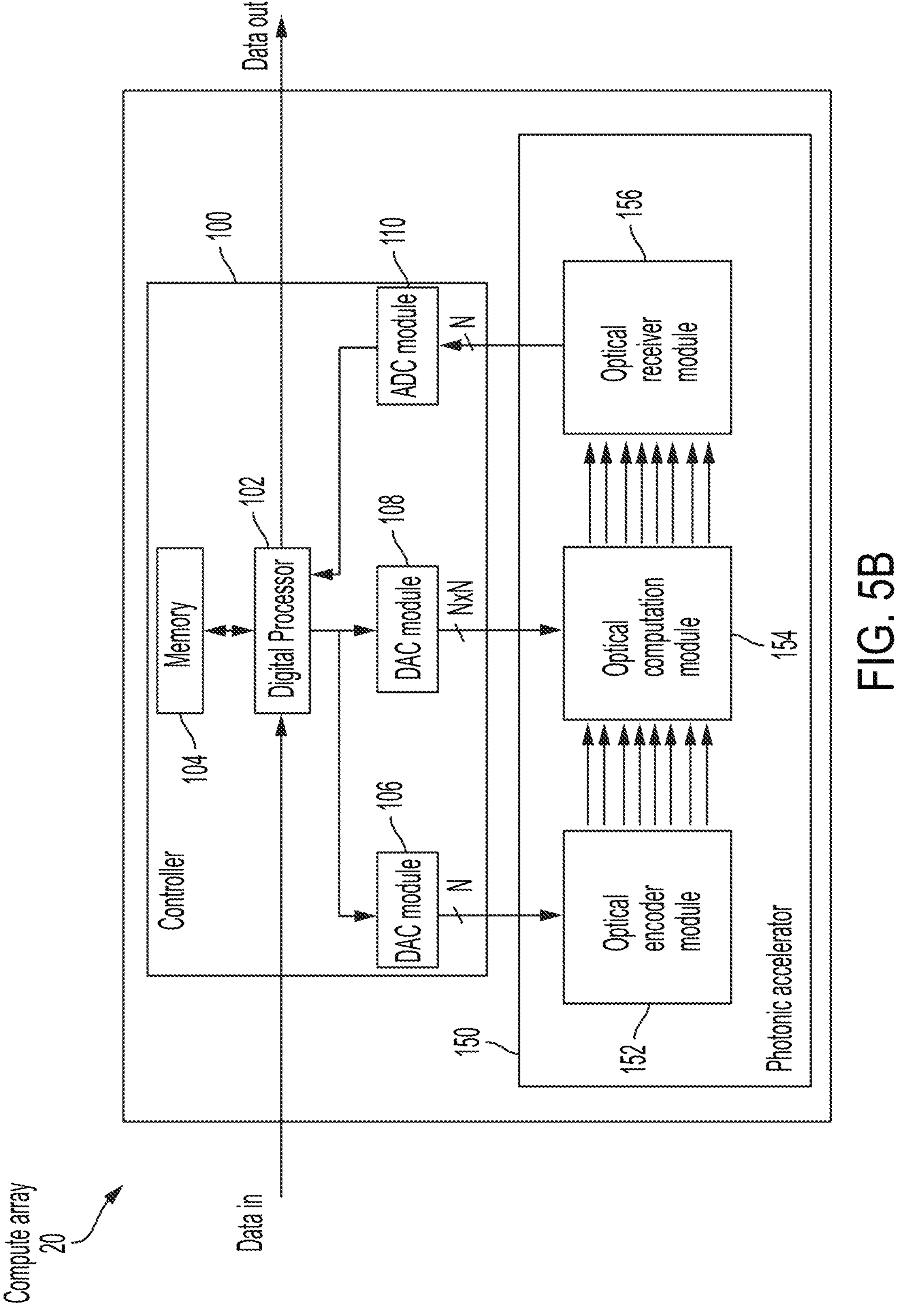
FIG. 5B is a block diagram illustrating a compute array configured to perform matrix-vector multiplication, in accordance with some embodiments.

FIG. 5B illustrates an example of a compute array 20 implemented using photonic circuits, in accordance with some embodiments. Compute array may be configured to perform matrix multiplications (e.g., matrix-vector multiplications or matrix-matrix multiplications or tensor multiplications). Compute array 20 includes a controller 100 and a photonic accelerator 150. Controller 100 operates in the digital domain and photonic accelerator 150 operates in the analog photonic domain.

Controller 100 includes a digital processor 102 and a memory 104 (which may be part of memory system 10). Photonic accelerator 150 includes an optical encoder module 152, an optical computation module 154 and an optical receiver module 156. Digital-to-analog (DAC) modules 106 and 108 convert digital data to analog signals. Analog-to-digital (ADC) module 110 converts analog signals to digital values. Thus, the DAC/ADC modules provide an interface between the digital domain and the analog domain. In this example, DAC module 106 produces N analog signals (one for each entry of an input vector), DAC module 108 produces N×N analog signals (one for each entry of a matrix), and ADC module 110 receives N analog signals (one for each entry of an output vector). Although matrix W is square in this example, it may be rectangular in some embodiments, such that the size of the output vector differs from the size of the input vector.

Compute array 20 receives, as an input from an external processor (e.g., a CPU), an input vector represented by a group of input bit strings and produces an output vector represented by a group of output bit strings. For example, if the input vector is an N-dimensional vector, the input vector may be represented by N separate bit strings, each bit string representing a respective component of the vector. The input bit string may be received as an electronic signal from the external processor and the output bit string may be transmitted as an electronic signal to the external processor. In some embodiments, digital processor 102 does not necessarily output an output bit string after every process iteration. Instead, the digital processor 102 may use one or more output bit strings to determine a new input bit stream to feed through the components of the compute array 20. In some embodiments, the output bit string itself may be used as the input bit string for a subsequent iteration of the process implemented by the compute array 20. In other embodiments, multiple output bit streams are combined in various ways to determine a subsequent input bit string. For example, one or more output bit strings may be summed together as part of the determination of the subsequent input bit string.

DAC module 106 is configured to convert digital data into analog signals. The optical encoder module 152 is configured to convert the analog signals into optically encoded information to be processed by the optical computation module 154. The information may be encoded in the amplitude, phase and/or frequency of an optical pulse. Accordingly, optical encoder module 152 may include optical amplitude modulators, optical phase modulators and/or optical frequency modulators. In some embodiments, the optical signal represents the value and sign of the associated bit string as an amplitude and a phase of an optical pulse. In some embodiments, the phase may be limited to a binary choice of either a zero phase shift or a it phase shift, representing a positive and negative value, respectively. Embodiments are not limited to real input vector values. Complex vector components may be represented by, for example, using more than two phase values when encoding the optical signal.

The optical encoder module 152 outputs N separate optical pulses that are transmitted to the optical computation module 154. Each output of the optical encoder module 152 is coupled one-to-one to an input of the optical computation module 154. In some embodiments, the optical encoder module 152 may be disposed on the same substrate as the optical computation module 154 (e.g., the optical encoder module 152 and the optical computation module 154 are on the same chip). In such embodiments, the optical signals may be transmitted from the optical encoder module 152 to the optical computation module 154 in waveguides, such as silicon photonic waveguides.

The optical computation module 154 performs the multiplication of an input vector X by a matrix W. In some embodiments, optical computation module 154 includes multiple optical multipliers each configured to perform a scalar multiplication between an entry of the input vector and an entry of matrix W in the photonic domain. Optionally, optical computation module 154 may further include optical adders for adding the results of the scalar multiplications to one another in the photonic domain. Alternatively, the additions may be performed electrically. For example, optical receiver module 156 may produce a voltage resulting from the integration (over time) of a photocurrent received from a photodetector.

The optical computation module 154 outputs N separate optical pulses that are transmitted to the optical receiver module 156. Each output of the optical computation module 154 is coupled one-to-one to an input of the optical receiver module 156. In some embodiments, the optical computation module 154 may be disposed on the same substrate as the optical receiver module 156 (e.g., the optical computation module 154 and the optical receiver module 156 are on the same chip). In such embodiments, the optical signals may be transmitted from the optical computation module 154 to the optical receiver module 156 in silicon photonic waveguides. In other embodiments, the optical computation module 154 may be disposed on a separate substrate from the optical receiver module 156.

The optical receiver module 156 receives the N optical pulses from the optical computation module 154. Each of the optical pulses is then converted to an electrical analog signal. In some embodiments, the intensity and phase of each of the optical pulses is detected by optical detectors within the optical receiver module. The electronic signals representing those measured values are then converted into the digital domain using ADC module 110, and provided back to the digital processor 102.

The digital processor 102 controls the optical encoder module 152, the optical computation module 154 and the optical receiver module 156. The memory 104 may be used to store input and output bit strings and measurement results from the optical receiver module 156. The memory 104 also stores executable instructions that, when executed by the digital processor 102, control the optical encoder module 152, optical computation module 154 and optical receiver module 156. The memory 104 may also include executable instructions that cause the digital processor 102 to determine a new input vector to send to the optical encoder based on a collection of one or more output vectors determined by the measurement performed by the optical receiver module 156. In this way, the digital processor 102 can control an iterative process by which an input vector is multiplied by multiple matrices by adjusting the settings of the optical computation module 154 and feeding detection information from the optical receiver module 156 back to the optical encoder module 152. Thus, the output vector transmitted by the compute array 20 to the external processor may be the result of multiple matrix-matrix multiplications, not simply a single matrix-matrix multiplication.

Figure 5C:
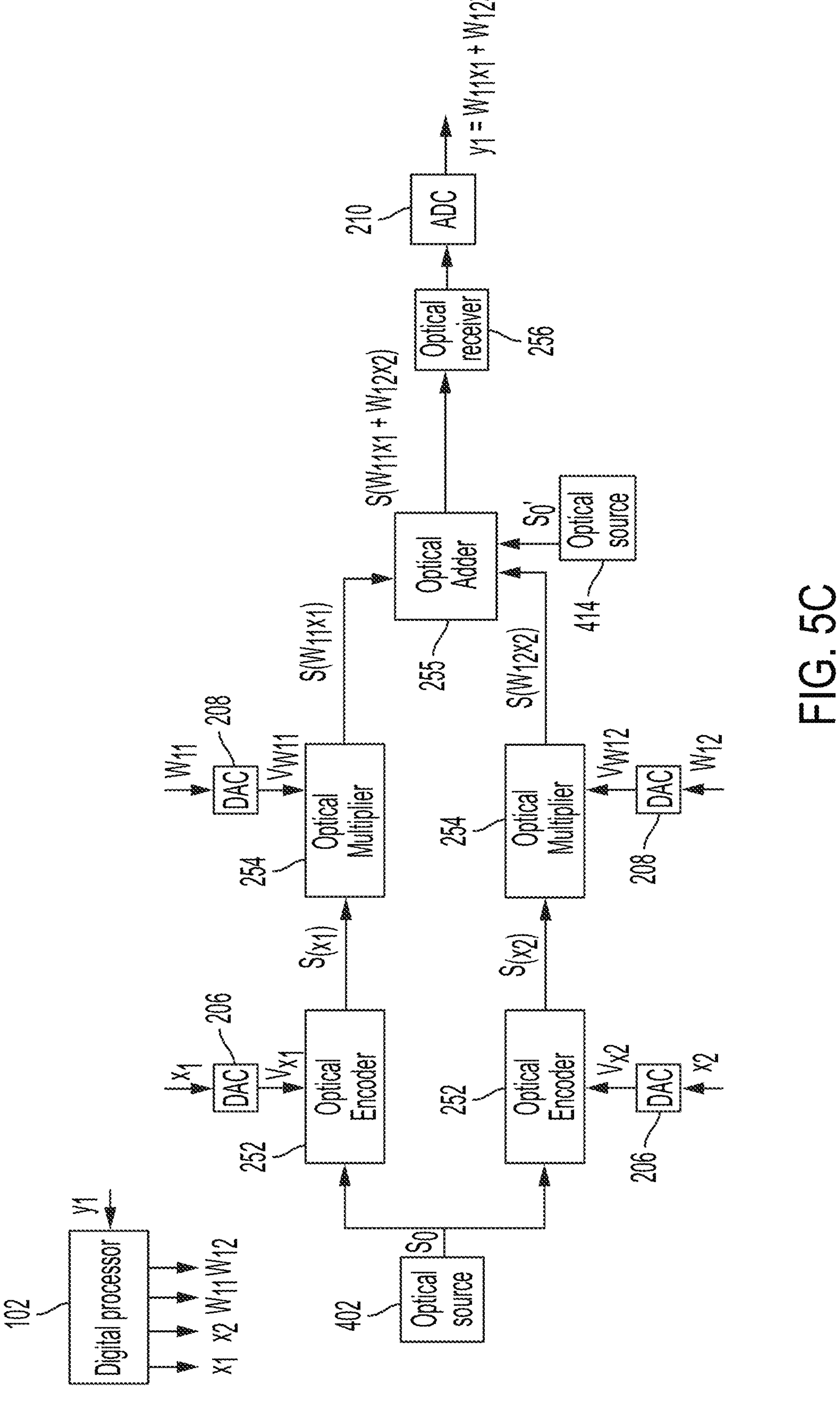
FIG. 5C is a block diagram illustrating a portion of the photonic accelerator of FIG. 5B, in accordance with some embodiments.

FIG. 5C illustrates a portion of photonic accelerator 150 in additional detail, in accordance with some embodiments. More specifically, FIG. 5C illustrates the circuitry for computing $y_1$, the first entry of output vector Y. For simplicity, in this example, the input vector has only two entries, $x_1$ and $x_2$. However, the input vector may have any suitable size.

DAC module 106 includes DACs 206, DAC module 108 includes DACs 208, and ADC module 110 includes ADC 210. DACs 206 produce electrical analog signals (e.g., voltages or currents) based on the value that they receive. For example, voltage $V_{X1}$ represents value $x_1$, voltage $V_{X2}$ represents value $x_2$, voltage $V_{W11}$ represents value $W_{11}$, and voltage $V_{W12}$ represents value $W_{12}$. Optical encoder module 152 includes optical encoders 252, optical computation module 154 includes optical multipliers 154 and optical adder 255, and optical receiver module 156 includes optical receiver 256.

Optical source 402 produces light $S_0$. Optical source 402 may be implemented in any suitable way. For example, optical source 402 may include a laser, such as an edge-emitting laser of a vertical cavity surface emitting laser (VCSEL), examples of which are described in detail further below. In some embodiments, optical source 402 may be configured to produce multiple wavelengths of light, which enables optical processing leveraging wavelength division multiplexing (WDM), as described in detail further below. For example, optical source 402 may include multiple laser cavities, where each cavity is specifically sized to produce a different wavelength.

The optical encoders 252 encode the input vector into a plurality of optical signals. For example, one optical encoder 252 encodes input value $x_1$ into optical signal $S(x_1)$ and another optical encoder 252 encodes input value $x_2$ into optical signal $S(x_2)$. Input values $x_1$ and $x_2$, which are provided by digital processor 102, are digital signed real numbers (e.g., with a floating point or fixed point digital representation). The optical encoders modulate light $S_0$ based on the respective input voltage. For example, optical encoder 404 modulates amplitude, phase and/or frequency of the light to produce optical signal $S(x_1)$ and optical encoder 406 modulates the amplitude, phase and/or frequency of the light to produce optical signal $S(x_2)$. The optical encoders may be implemented using any suitable optical modulator, including for example optical intensity modulators. Examples of such modulators include Mach-Zehnder modulators (MZM), Franz-Keldysh modulators (FKM), resonant modulators (e.g., ring-based or disc-based), nano-electro-electro-mechanical-system (NOEMS) modulators, etc.

The optical multipliers are designed to produce signals indicative of a product between an input value and a matrix value. For example, one optical multiplier 254 produces a signal $S(W_{11}x_1)$ that is indicative of the product between input value $x_1$ and matrix value $A_{11}$ and another optical multiplier 254 produces a signal $S(W_{12}x_2)$ that is indicative of the product between input value $x_2$ and matrix value $W_{12}$. Examples of optical multipliers include Mach-Zehnder modulators (MZM), Franz-Keldysh modulators (FKM), resonant modulators (e.g., ring-based or disc-based), nano-electro-electro-mechanical-system (NOEMS) modulators, etc. In one example, an optical multiplier may be implemented using a modulatable detector. Modulatable detectors are photodetectors having a characteristic that can be modulated using an input voltage. For example, a modulatable detector may be a photodetector with a responsivity that can be modulated using an input voltage. In this example, the input voltage (e.g., $V_{W11}$) sets the responsivity of the photodetector. The result is that the output of a modulatable detector depends not only on the amplitude of the input optical signal but also on the input voltage. If the modulatable detector is operated in its linear region, the output of a modulatable detector depends on the product of the amplitude of the input optical signal and the input voltage (thereby achieving the desired multiplication function).

Optical adder 412 receives electronic analog signals $S(W_{11}x_1)$ and $S(W_{12}x_2)$ and light $S_0'$ (generated by optical source 414), and produces an optical signal $S(W_{11}x_1+W_{12}x_2)$ that is indicative of the sum of $W_{11}x_1$ with $W_{12}x_2$.

Optical receiver 256 generates an electronic digital signal indicative of the sum $W_{11}x_1+W_{12}x_2$ based on the optical signal $S(W_{11}x_1+W_{12}x_2)$. In some embodiments, optical receiver 256 includes a coherent detector and a trans-impedance amplifier. The coherent detector produces an output that is indicative of the phase difference between the waveguides of an interferometer. Because the phase difference is a function of the sum $W_{11}x_1+W_{12}x_2$, the output of the coherent detector is also indicative of that sum. The ADC converts the output of the coherent receiver to output value $y_1=W_{11}x_1+W_{12}x_2$. Output value $y_1$ may be provided as input back to digital processor 102, which may use the output value for further processing.

IV. Additional Comments

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The definitions, as defined and used herein, should be understood to control over dictionary definitions, definitions in documents incorporated by reference and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some case and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately," "substantially," and "about" may be used to mean within ±10% of a target value in some embodiments. The terms "approximately," "substantially," and "about" may include the target value.

Use of ordinal terms such as "first," "second," "third," etc., in the claims to modify a claim element does not by itself connotate any priority, precedence, or order of one claim element over another or the temporal order in which acts of a method are performed, but are used merely as labels to distinguish one claim element having a certain name from another claim element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A system for manipulating an input vector, comprising:

a plurality of optical switches configured to receive the input vector; and a controller configured to:

obtain an output vector based on the input vector by controlling the plurality of optical switches to select from among a nominal orientation vector and a transpose orientation vector as the output vector, and store the output vector in a section of a memory system, wherein the nominal orientation vector and the transpose orientation vector represent transposed versions of one another.

2. The system of claim 1, wherein the nominal orientation vector has a same orientation as the input vector, and the transpose orientation vector has an opposite orientation with respect to the input vector.

3. The system of claim 1, wherein the controller is further configured to: store the nominal orientation vector in a first section of a memory system, or store the transpose orientation vector in a second section of the memory system.

4. The system of claim 1, wherein the optical switches comprise at least one of a Mach-Zehnder interferometer, a microring resonator, a photonic crystal cavity, and a movable optical element.

5. The system of claim 1, wherein the controller is configured to obtain the nominal orientation vector by generating a first plurality of electronic signals, wherein generating the first plurality of electronic signals comprises controlling the plurality of optical switches to route the input vector to a first plurality of optical receivers.

6. The system of claim 5, wherein an optical receiver of the first plurality of optical receivers comprises a photodetector, an amplifier, and an analog-to-digital converter.

7. The system of claim 5, wherein the controller is configured to obtain the transpose orientation vector by generating a second plurality of electronic signals, wherein generating the second plurality of electronic signals comprises controlling the plurality of optical switches to route the input vector to a second plurality of optical receivers.

8. A method for manipulating an input vector, comprising:

controlling, by a controller, a plurality of optical switches to obtain an output vector based on a plurality of input optical signals encoding the input vector and received at the plurality of optical switches, by selecting from among a nominal orientation vector and a transpose orientation vector as the output vector and storing the output vector in a section of a memory system, wherein the nominal orientation vector and the transpose orientation vector represent transposed versions of one another.

9. The method of claim 8, wherein obtaining the nominal orientation vector comprises: generating a first plurality of electronic signals by controlling the plurality of optical switches to route the plurality of input optical signals to a first plurality of optical receivers, and storing the first plurality of electronic signals in a first section of a memory system configured to store vectors in accordance with a nominal orientation.

10. The method of claim 9, wherein obtaining the transpose orientation vector comprises: generating a second plurality of electronic signals by controlling the plurality of optical switches to route the plurality of input optical signals to a second plurality of optical receivers, and storing the second plurality of electronic signals in a second section of the memory system configured to store vectors in accordance with a transpose orientation.

11. The method of claim 8, wherein the transpose orientation vector is a transposed version of the input vector.

12. The method of claim 8, further comprising generating the plurality of input optical signals using optical matrix multiplication.

13. A system for manipulating an input vector, comprising:

a plurality of optical switches comprising a first optical output and a second optical output, the plurality of optical switches being configured to receive a plurality of input optical signals encoding the input vector;

a first plurality of optical receivers coupled to the respective first optical outputs of the plurality of optical switches, and a second plurality of optical receivers coupled to the respective second optical outputs of the plurality of optical switches;

a memory system comprising a first section configured to store vectors in accordance with a nominal orientation and a second section configured to store vectors in accordance with a transpose orientation, wherein the nominal orientation and the transpose orientation represent transposed versions of one another; and a controller configured to select between obtaining a nominal orientation vector and a transpose orientation vector, wherein:

obtaining the nominal orientation vector comprises generating a first plurality of electronic signals by controlling the plurality of optical switches to route the plurality of input optical signals to the first plurality of optical receivers, and storing the first plurality of electronic signals in the first section of the memory system, and obtaining the transpose orientation vector comprises generating a second plurality of electronic signals by controlling the plurality of optical switches to route the plurality of input optical signals to the second plurality of optical receivers, and storing the second plurality of electronic signals in the second section of the memory system.

14. The system of claim 13, wherein the transpose orientation vector is a transposed version of the input vector.

15. The system of claim 13, wherein the optical switches comprise at least one of a Mach-Zehnder interferometer, a microring resonator, a photonic crystal cavity, and a movable optical element.

16. The system of claim 13, wherein the optical receivers comprise optical detectors and analog-to-digital converters (ADC).

17. The system of claim 13, wherein the first and second sections of the memory system are part of a common memory chip.

18. The system of claim 13, wherein the first section of the memory system is part of a first memory chip, and the second section of the memory system is part of a second memory chip.

19. The system of claim 13, wherein the memory system comprises a static random access memory (SRAM).

20. The system of claim 13, further comprising a photonic accelerator configured to generate the plurality of input optical signals using optical matrix multiplication.

* * * * *